May 1, 1928. 1,668,206
W. J. HUGHES
FILTER AND WATER SOFTENING APPARATUS OF THE FILTER TYPE
Filed June 15, 1925
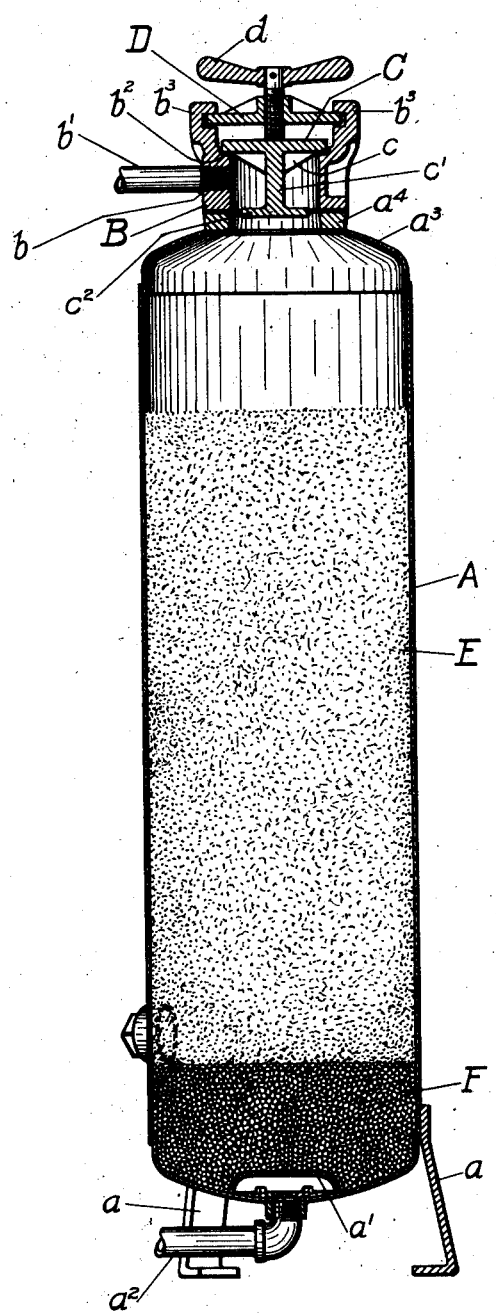
INVENTOR
Walter J. Hughes
BY Walter A. Knight.
ATTORNEY Patented May 1, 1928.

1,668,206

UNITED STATES PATENT OFFICE.

WALTER J. HUGHES, OF FORT WAYNE, INDIANA, ASSIGNOR, BY MESNE ASSIGNMENTS, TO THE PERMUTIT COMPANY, OF NEW YORK, N. Y., A CORPORATION OF DELAWARE.

FILTER AND WATER-SOFTENING APPARATUS OF THE FILTER TYPE.

Application filed June 15, 1925. Serial No. 37,203.

My invention relates to filters and water softening apparatus of the filter type having a bed of base exchange silicates through which water to be softened passes; and more particularly to a hand-hole head for same.

The particular object of my invention is to provide a hand-hole having in combination a suitably positioned water inlet and combined water stilling baffle and cover plate.

In the particular embodiment of my invention selected for illustration shown in the accompanying drawing, a water softening apparatus of the filter type, filled to the usual extent with gravel at the bottom and base exchange silicates superimposed upon the gravel, has a hand-hole at the top, with a horizontal inlet and a cover plate on the inner side of which is an axial stem carrying a circular baffle.

Referring now to the drawing A is the casing adapted to rest on legs $a$ and having a slotted strainer $a^1$ and a pipe $a^2$ connected to the center of a bulging bottom head. To the bulging top head $a^3$ is secured, in any suitable way as by the weld-ring $a^4$, by bolts (not shown) or in any other convenient manner, a hand-hole head B, with a horizontal inlet orifice $b$ into which is screwed pipe $b^1$.

The head is formed at the top with a shoulder $b^2$ upon which is adapted to rest a gasketed cover plate C having strengthening webs $c$ and an axial stem $c^1$ upon the lower end of which, below the inlet $b$, is the water stilling baffle $c^2$, preferably circular in shape and placed axially of the vertical cylindrical opening of the head so as to leave an annular water passage between its edges and the inner cylindrical wall of the head B. The cover plate C is held in position in any convenient manner, as by the usual yoke D, contacted with hooked lugs $b^3$, and the hand screw $d$. The bed of base exchange silicates or water softening medium E rests upon the usual supporting gravel F.

It will readily be seen that when the inflowing raw water passes through the pipe $a^1$ into the vertical cylindrical chamber of the head B it passes by gravity downwardly through the annular passage between the edge of the baffle $c^2$ and the cylindrical wall of the head, distributing itself over the top of the filter bed. During the water softening operation the filter casing A is entirely full so that the inflowing water does not disturb the surface of the filter bed.

In back-washing the filter by passing the back wash water upwardly through the filter bed the baffle prevents the washing out of any of the comminuted mineral at any proper rate of flow and permits the use of a higher column of mineral in the bed, that is; allowance is made for less space above the bed than would otherwise be required.

The baffle being combined with the cover plate and therefore removable with it permits free access to the interior of the casing at the top when required for regenerating or for any other purpose.

I claim as my invention and desire to secure by Letters Patent of the United States.

1. The combination of a hand-hole head, a water inlet through said head, a cover plate for the hand-hole in said head, and a baffle fixed to the cover plate in such a position as to be below the said inlet when said cover plate is in position on the head.

2. The combination of a hand-hole head with a water inlet substantially at right angles to the main opening and a combined cover plate and baffle for said head.

3. The combination of a hand-hole head having a water inlet through its side and a cover plate carrying on its inner face an axial stem and a baffle below said inlet fixed to said stem.

In testimony whereof I have hereunto set my hand.

WALTER J. HUGHES.